Aug. 17, 1965  C. L. EMMERICH ETAL  3,201,779
MAGNETIC ENCODER
Filed April 13, 1962  5 Sheets-Sheet 2

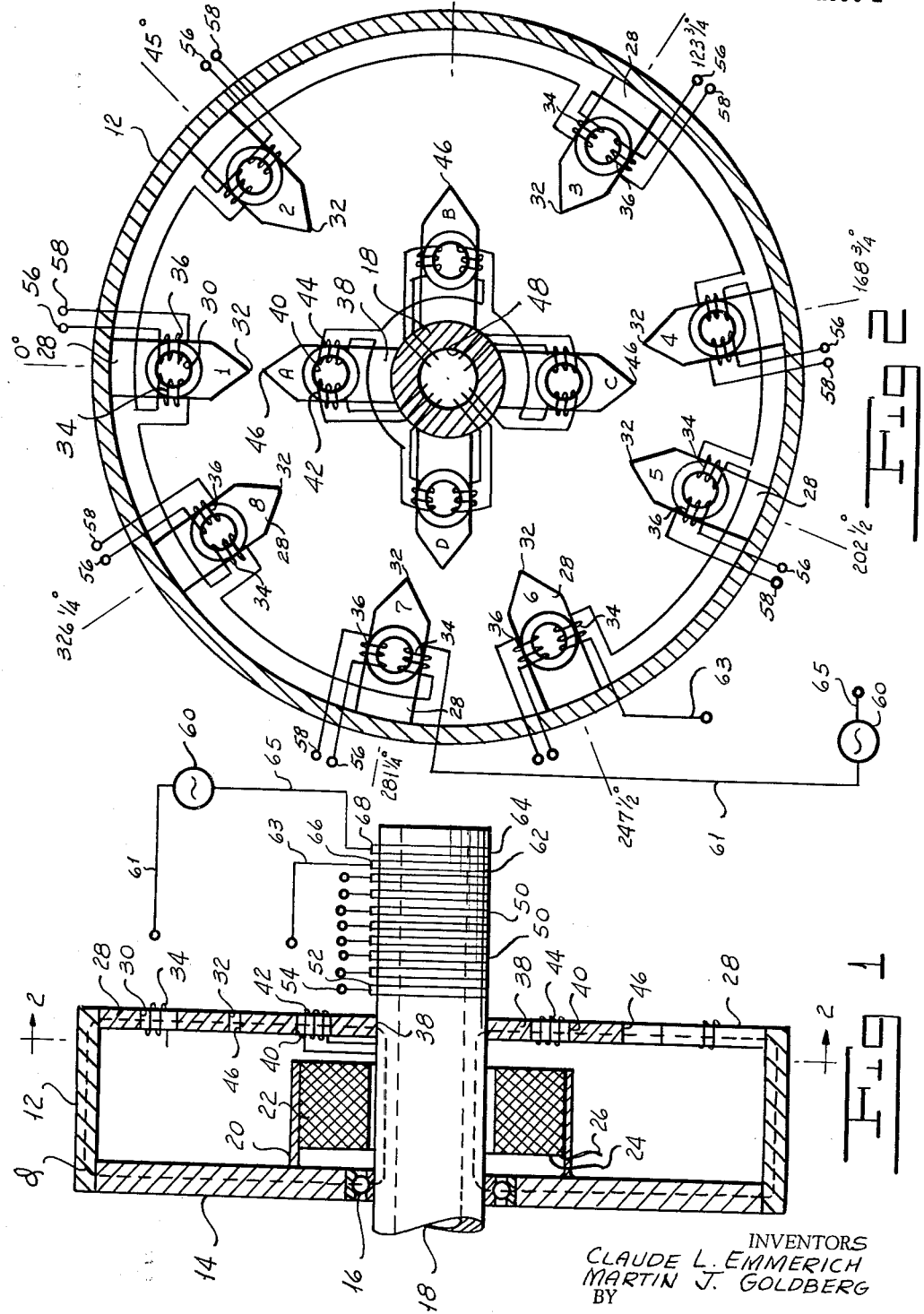

INVENTORS
CLAUDE L. EMMERICH
MARTIN J. GOLDBERG
BY
Shenier & O'Connor
ATTORNEYS

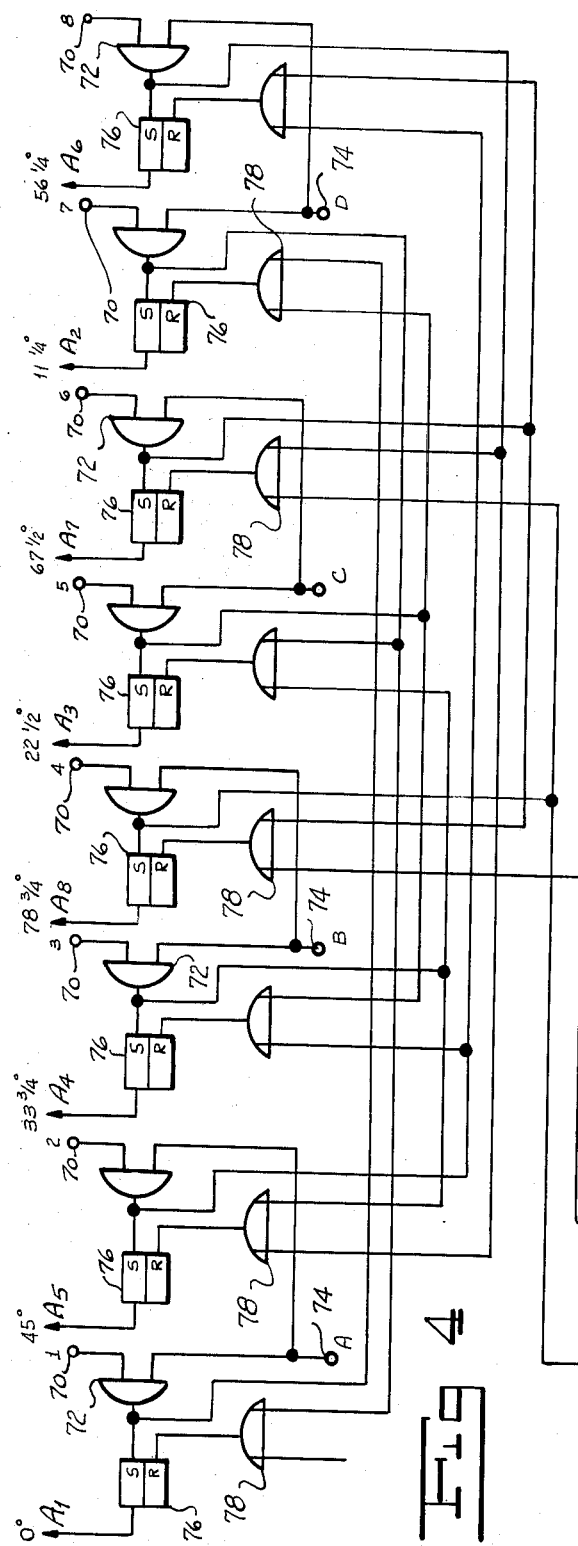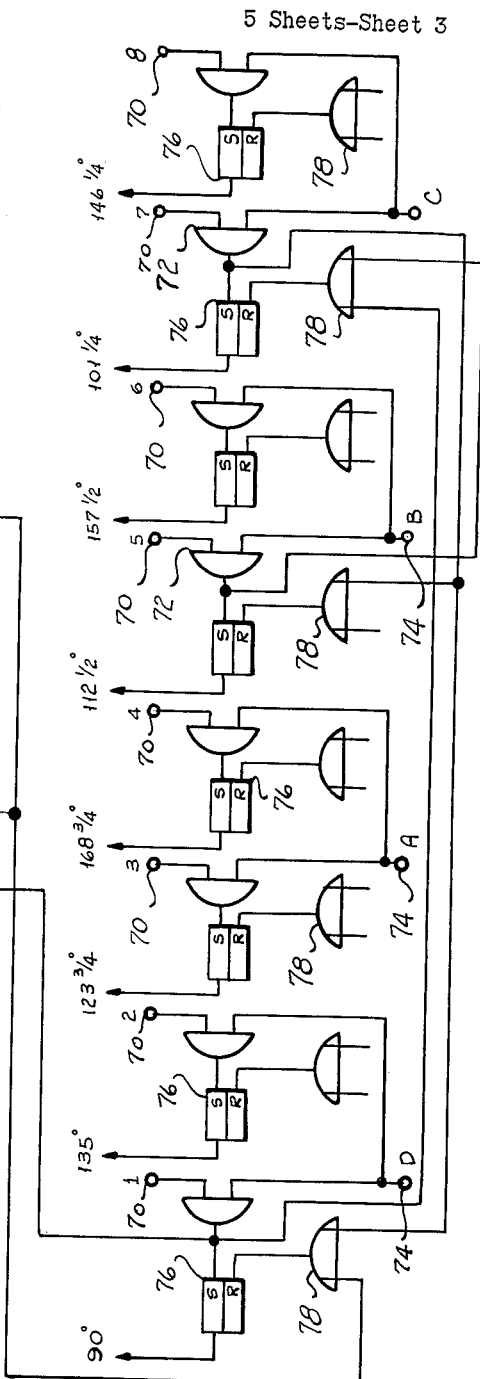
FIG. 4

Aug. 17, 1965  C. L. EMMERICH ETAL  3,201,779
MAGNETIC ENCODER
Filed April 13, 1962  5 Sheets-Sheet 4
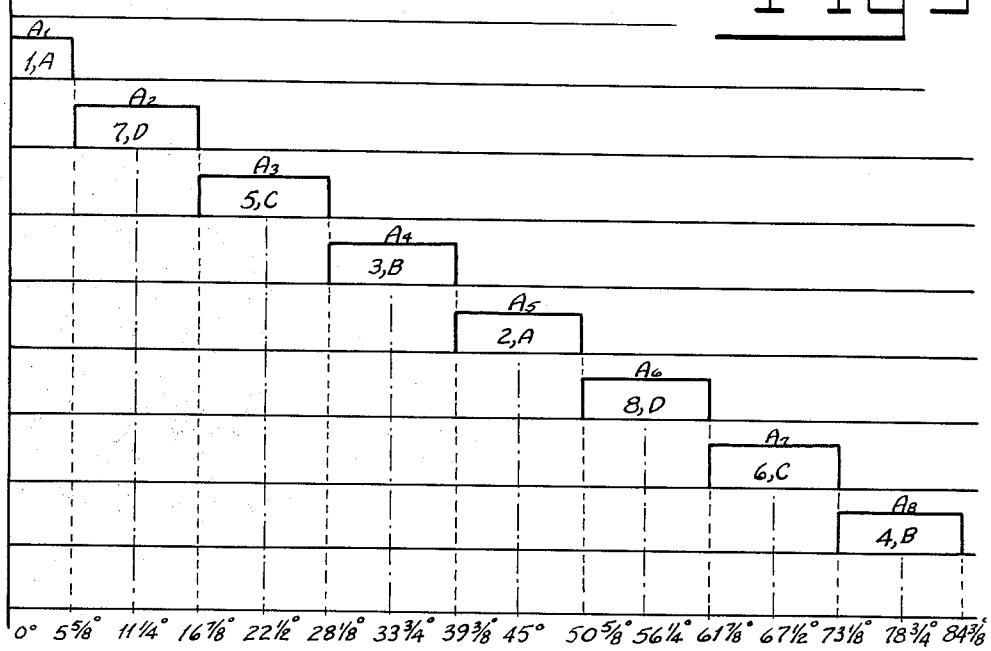
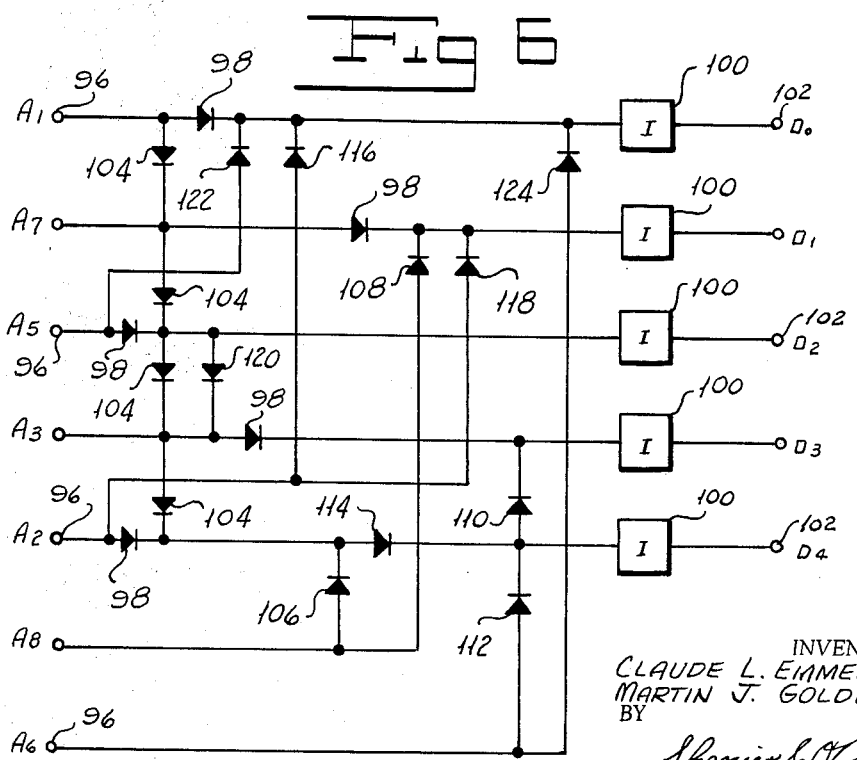
INVENTOR.
CLAUDE L. EMMERICH
MARTIN J. GOLDBERG
BY
Shenier & O'Connor
ATTORNEYS

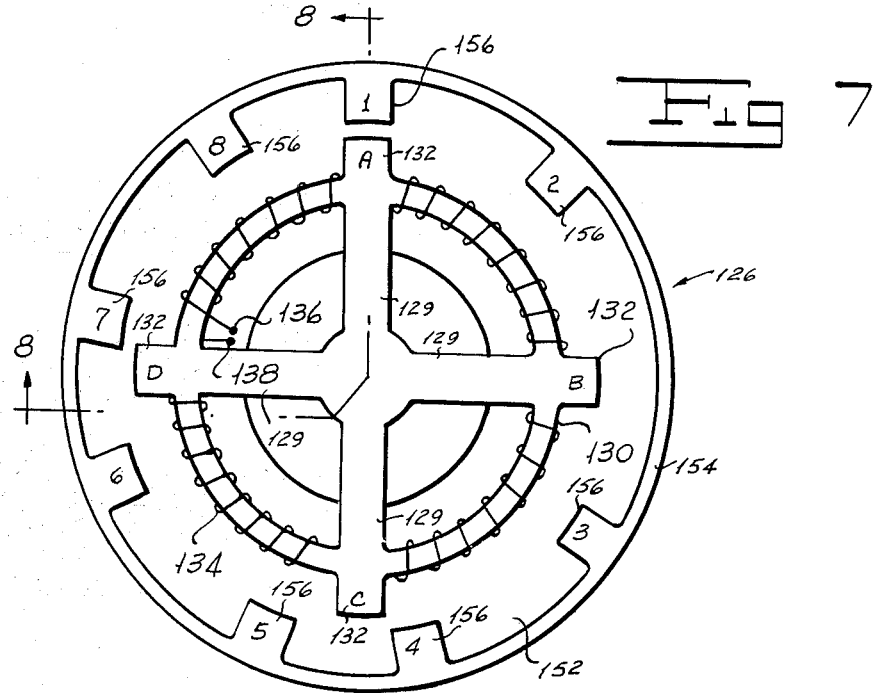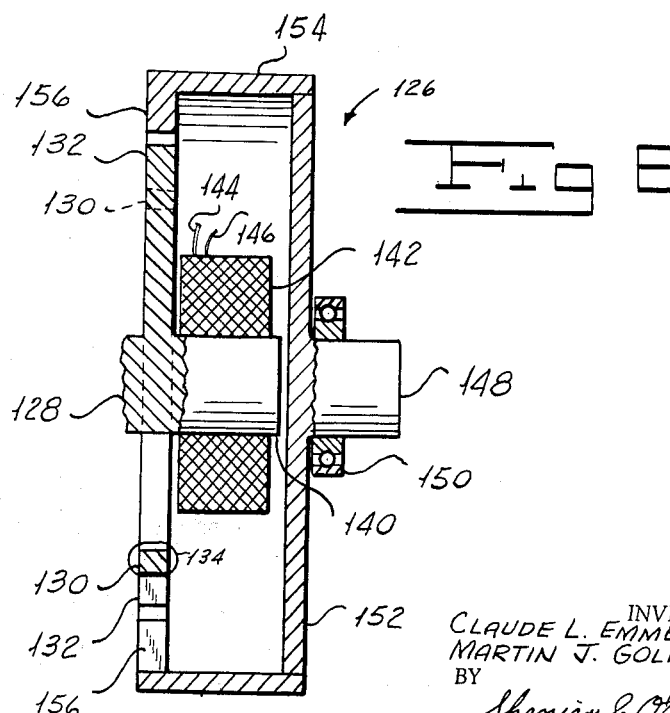

United States Patent Office

3,201,779
Patented Aug. 17, 1965

3,201,779
MAGNETIC ENCODER
Claude L. Emmerich, Scarsdale, N.Y., and Martin J. Goldberg, Stamford, Conn., assignors to United Aircraft Corporation, East Hartford, Conn., a corporation of Delaware
Filed Apr. 13, 1962, Ser. No. 187,269
10 Claims. (Cl. 340—347)

Our invention relates to a magnetic encoder and more particularly to a shaft position encoder having a high resolution for the number of elements it employs.

Various forms of shaft position encoders are known in the prior art. These devices include a plurality of elements with respect to which a pick-off device such as a brush or a capacitor plate is moved to produce a predetermined number of pulses per revolution of the shaft, the position of which is to be encoded. The elements of encoders of the prior art are separated by interelement spaces and the resolution which is possible with encoders of this type for a given size is determined by the aggregate insulating interelement space which must be provided for the number of elements being used. That is, in the prior art for a given size of the disk of a shaft position encoder, the possible resolution which can be provided is determined by the required interelement space necessary to produce the desired result.

We have invented a magnetic encoder which permits us to obtain a high resolution while employing fewer elements than are required in the prior art to obtain this resolution. Our encoder permits us to use a relatively large interelement spacing for the resolution provided by an encoder. By virtue of our construction we are able to construct a converter of a given resolution which is much smaller than an encoder of the prior art having the same resolution.

One object of the invention is to provide a shaft position encoder which has a high resolution for the number of elements employed.

A further object of our invention is to provide a magnetic encoder which permits relatively wide interelement spacing for the resolution provided by the converter.

Another object of our invention is to provide a magnetic encoder of a given resolution which is much smaller than a converter of the prior art having the same resolution.

A still further object of our invention is to provide a magnetic encoder which requires fewer elements to produce a given resolution.

Yet another object of our invention is to provide a magnetic encoder the output of which has a very low order of ambiguity.

Other and further objects of our invention will appear from the following description.

In general our invention contemplates the provision of a magentic shaft position encoder in which a plurality of first elements circumferentially spaced around a stationary member cooperate with a plurality of second elements circumferentially spaced around the shaft whose position is to be represented. We so space the elements that one of the first elements registers with one of the second elements at a large number of relative positions of the first and second members in the course of a revolution of the shaft. Each time a first element registers with a second element an output indication of shaft position is produced.

In the accompanying drawings which form part of the instant specification and which are to be read in conjunction therewith and in which like reference numerals are used to indicate like parts in the various views:

FIGURE 1 is a sectional view of one form of our magnetic encoder.

FIGURE 2 is a sectional view of the form of our magnetic encoder shown in FIGURE 1 taken along the line 2—2 of FIGURE 1.

FIGURE 3 is a diagram illustrating the relationship between the outputs of the elements of the form of our magnetic encoder shown in FIGURE 2.

FIGURE 4 is a block diagram of an arrangement for producing a digital representation of shaft position from the outputs of the elements of the form of our encoder shown in FIGURES 1 and 2.

FIGURE 6 is a block diagram illustrating the manner in which a binary coded output can be produced from the elements of the outputs of elements of the block diagram of FIGURE 4.

FIGURE 7 is an elevation of an alternate form of our magnetic encoder.

FIGURE 8 is a sectional view of the form of our magnetic encoder shown in FIGURE 7 taken along the line 8—8 of FIGURE 7.

Figure 5:
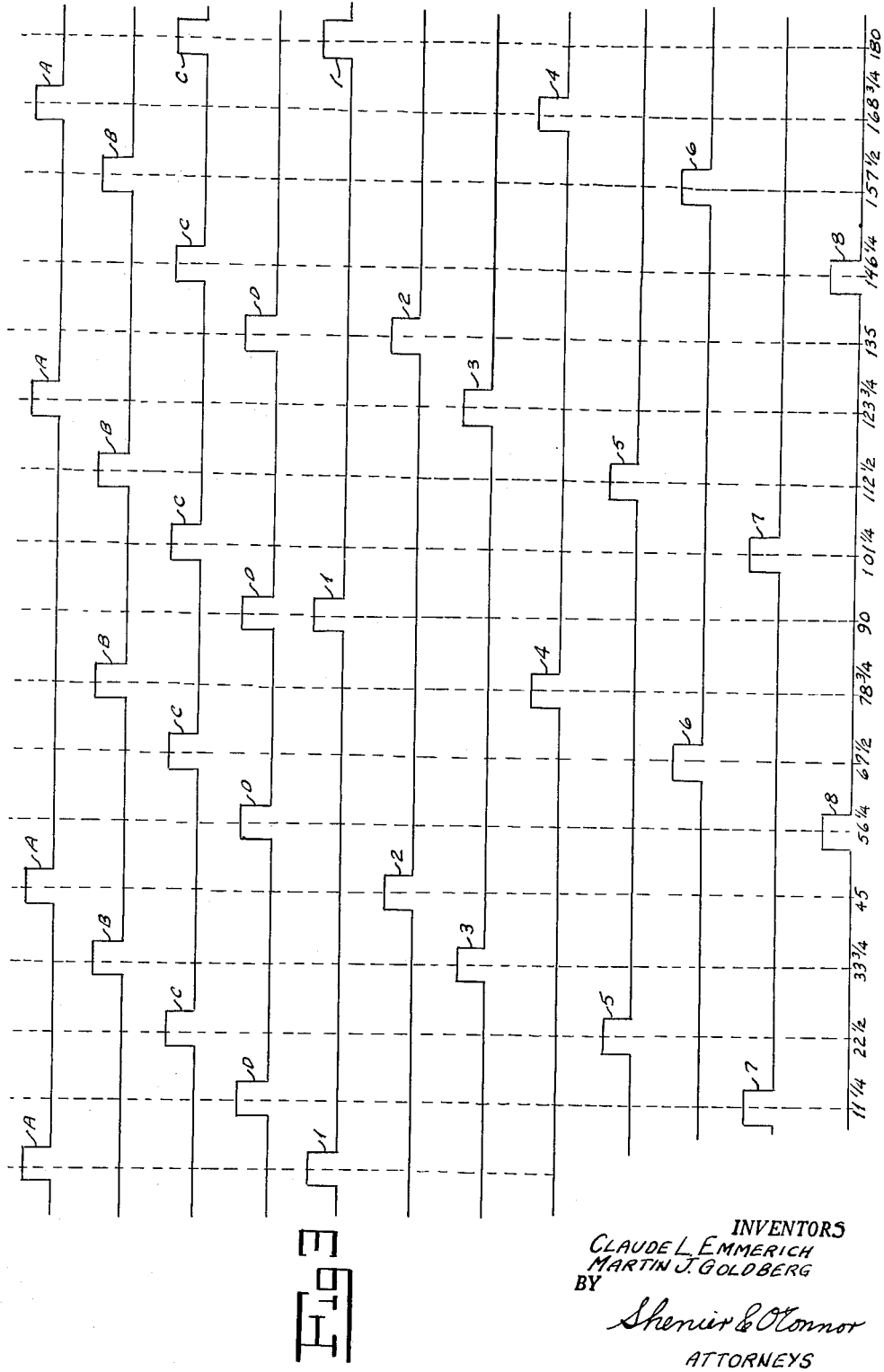
FIGURE 5 is a diagram illustrating the outputs of a portion of the circuit illustrated in the block diagram of FIGURE 4.

Referring now to FIGURES 1 and 2 the form of our magnetic encoder illustrated therein includes a housing 12 one end of which is provided with a plate 14 carrying a bearing 16 which rotatably supports a hollow shaft 18. A support 20 secured to the plate 14 by any suitable means carries a winding 22 adapted to be energized with D.C. or with A.C. of a suitable phase relationship with respect to the source which energized the element input windings to be described hereinafter, through conductors 24 and 26 to produce a magnetic flux which passes through the shaft 18 and through the plate 14 and housing 12 along paths indicated by broken lines in FIGURES 1 and 2. We form the housing 12, the plate 14 and the shaft 18 from a suitable magnetic material to permit the passage of flux therethrough as indicated. Winding 22 could, of course, be replaced by a permanent magnet, if desired.

We mounted a plurality of sensing elements 28 on the housing 12 in circumferentially spaced relationship by any suitable means such as by soldering, welding or the like. Each of the elements 28 is formed of magnetic material and is provided with an aperture 30 and with a knife edge 32. Each of the apertures 30 in effect forms a toroid which carries an input winding 34 and an output winding 36.

We secure a plurality of sensing elements 38 formed of magnetic material to the shaft 18 for rotation therewith by any suitable means such as by welding, soldering or the like. Each of the elements 38 has an aperture 40 forming a toroid carrying an output winding 42 and an input winding 44. We form each of the elements 38 with an outwardly directed knife edge 46. Conveniently, the terminals of winding 42 are brought into the central bore 48 of the shaft 18 and are connected to a plurality of respective slip rings 50 which are engaged by brushes 52 connected to output terminals 54. Each output winding 36 may be connected to a pair of terminals 56 and 58 at a suitable location outside the housing 12. We connect all the input windings 34 of elements 28 in series with a suitable source 60 of alternating current potential. We connect all the input windings 44 of the elements 38 in series between slip rings 62 and 64 engaged by respective brushes 66 and 68 connected to the soure 60. These connections may be made by suitable conductors 61, 63 and 65.

From the structure just described, it will be apparent that the winding 22 produces a magnetic flux which passes through shaft 18, plate 14, housing 12 and the elements 28 and 38. Further, it will be appreciated that as the shaft 18 rotates, knife edges 32 become aligned with knife edges 46. The arrangement is such that when a particular knife edge 32 or 46 is not aligned with another knife edge 46 or 32 then the winding 36 or 42 produces an output signal since its element 28 or 38 is not saturated by the flux produced by winding 22. In the event that a pair of knife edges 32 and 46 are aligned then the corresponding elements 28 and 38 are saturated and the associated windings 36 and 42 produce no output signals. Arbitrarily we have designated this condition of the elements as representing an "on" state.

In the particular embodiment of our encoder shown in FIGURES 1 and 2, for purposes of clarity we have designated the respective elements 28 by the numbers from 1 to 8 and we have designated the elements 38 by the respective letters A to D.

Further it will be seen that the elements 28 are not evenly spaced around the housing 12 but are disposed at the particular angular positions indicated around the periphery of the figures. We so mount the elements 38 on the shaft 18 that adjacent ones are perpendicular to each other. With this arrangement, as shaft 18 rotates, various ones of the elements 28 and 38 register in the course of a revolution of shaft 18. As is explained hereinabove, when a pair of the elements register then the associated output windings carry no signal indicating an "on" state or "1." In Table I below we have indicated those elements 28 and 38 which carry outputs for various relative positions of the shaft 18 with respect to the housing 12 at the first 90 degrees of relative displacement. It will be appreciated that in each of these relative positions a unique pair of elements is switched to the "on" state by our encoder.

*Table I*

| | 1 | 2 | 3 | 4 | 5 | 6 | 7 | 8 | A | B | C | D |
|---|---|---|---|---|---|---|---|---|---|---|---|---|
| 0° | 1 | 0 | 0 | 0 | 0 | 0 | 0 | 0 | 1 | 0 | 0 | 0 |
| 11¼° | 0 | 0 | 0 | 0 | 0 | 0 | 1 | 0 | 0 | 0 | 0 | 1 |
| 22½° | 0 | 0 | 0 | 0 | 1 | 0 | 0 | 0 | 0 | 0 | 1 | 0 |
| 33¾° | 0 | 0 | 1 | 0 | 0 | 0 | 0 | 0 | 0 | 1 | 0 | 0 |
| 45° | 0 | 1 | 0 | 0 | 0 | 0 | 0 | 0 | 1 | 0 | 0 | 0 |
| 56¼° | 0 | 0 | 0 | 0 | 0 | 0 | 0 | 1 | 0 | 0 | 0 | 1 |
| 67½° | 0 | 0 | 0 | 0 | 0 | 1 | 0 | 0 | 0 | 0 | 1 | 0 |
| 78¾° | 0 | 0 | 0 | 1 | 0 | 0 | 0 | 0 | 0 | 1 | 0 | 0 |
| 90° | 1 | 0 | 0 | 0 | 0 | 0 | 0 | 0 | 0 | 0 | 0 | 1 |

It is further to be understood that rather than spacing the elements 28 unevenly as shown in the figure, we could space these elements evenly at a separation of forty-five degrees in the particular example shown and we could space the elements 38 unevenly at locations, for example, of 0°, 101.25°, 202.5° and 303.75°. By this relative spacing of the stationary elements or teeth 28 and movable elements or teeth 38 only a small rotary displacement exists between successive angular positions at which two elements register though the intertooth spacing is relatively large.

In the particular embodiment of our magnetic encoder shown in FIGURES 1 and 2, sixty-four bits or outputs are provided per revolution of shaft 18. Any desirable number of bits within practical limits can be provided. Let the number of stationary teeth be $N_1$ and the number of rotating teeth be $N_2$. Then $N_2 = N_1/2$. Let the angular spacing between the rotating teeth be $Q_2$. Then $Q_2 = 360/N_2$ or $Q_2 = 720/N_1$. Let $N$ = number of desired bits. Then $N = 2N_1 N = N_1^2$.

Referring now to FIGURE 4 we have shown an arrangement for producing an indication of each of the shaft positions during a half revolution displacement of the shaft 18. We apply the outputs from the respective windings 36 of the teeth 28 to a plurality of input terminals 70 each of which provides one input of a respective two-input AND circuit 72. In a similar manner we apply the signals from windings 44 to respective input terminals 74 each of which provides the other input for a pair of the AND circuit 72. Each of the AND circuits 72 provides the "set" input for a flip-flop or bistable multivibrator circuit 76 having a set input section S and a reset input section R. As is known in the art when a signal is applied to the S section of the flip-flop this section carries an output signal. When the R section receives a signal then the S section has no output.

It will be remembered that in the "on" condition of the torids in FIGURE 2 the output windings carry no output voltage. For this reason we select the AND circuits 72 to be of the type which carry a voltage when both inputs are zero volts. That is, a "1" at any point in our system except at the output of the windings 36 and 44 indicates the presence of a voltage.

We provide a plurality of two-input OR circuits 78 for impressing signals on the R section of the flip-flops to prevent abiguous outputs. We accomplish this by providing the OR circuits 78 with inputs derived from AND circuits 72 other than those with which the OR circuits are associated. For purposes of clarity we have indicated the various angular positions indicated by flip-flops 76 above the output leads of the S sections thereof.

From the foregoing explanation it will be seen that each of our flip-flops 76 produces an output over 11¼° of arc, which output is centered about the angular position to which the particular flip-flop corresponds. In order to avoid a detailed description of the output of each flip-flop in FIGURE 5 we have shown these outputs over ninety degrees of displacement of shaft 18. Within each block indicating an output of a flip-flop 76 we have number and letter of the registering elements 28 and 38 whose winding outputs are fed to the input circuit of the flip-flop 76 which produces the output indicated by the block in FIGURE 5. The broken lines in the figure indicate the extent of the outputs while the dot-dash lines indicate the angular positions about which the outputs are centered. For example, the flip-flop 76 whose AND circuit 72 receives the 2 and A signals produces an output from the 39⅜° position to the 50⅝° position with the output centered at the 45° position. The other flip-flop outputs can readily be seen in FIGURE 5. For convenience of reference we have indicated the flip-flop outputs in FIGURE 4 and the corresponding representations in FIGURE 5 over the first 90° of shaft rotation as $A_1$ to $A_8$.

Referring now to FIGURE 6, we have shown a circuit for converting the outputs from the AND circuits of FIGURE 4 into a binary coded representation of shaft position. For purposes of simplicity we have limited the showing of FIGURE 6 in the first 90° of shaft rotation. We apply the outputs from the respective flip-flops 76 of FIGURE 4 to a plurality of terminals 96 in the order indicated adjacent the terminals 96 in FIGURE 6 by characters $A_1$ to $A_8$. Respective blocking diodes 98 connect the terminals 96 to which the outputs $A_1$, $A_7$, $A_5$, $A_3$ and $A_2$ are applied to a plurality of inverters 100 the outputs of which appear at respective terminals 102 to indicate the respective bits $D_0$ to $D_4$ of the binary coded representation. A plurality of series connected diodes 104 couple adjacent terminals 96 to save those to which the outputs $A_8$ and $A_6$ are applied. A pair of diodes 106 and 108 couple the terminal 96 to which the output $A_8$ is applied respectively to the channel associated with the terminals 96 to which the outputs $A_2$ and $A_7$ are applied. A pair of series connected diodes 110 and 112 carry the output $A_6$ to the inverters 100 associated with outputs $D_3$ and $D_4$. A blocking diode 114 isolates diode 112 from diode 106. Respective crystals or diodes 116 and 118 connect the terminal 96 to which the output $A_2$ is applied to the inverter 100 which provides output $D_0$ and to the inverter providing the output $D_1$. A diode 120 connects the terminal 96 to which the output $A_3$ is applied to the inverter 100 which provides the output $D_2$. We connect a diode 122 between the terminal 96 to which the output $A_5$ is applied and the inverter 100 which provides the output $D_0$. A diode 124 connects the terminal 96 on which the output $A_6$ is impressed to the inverter 100 providing the output $D_0$.

The operation of the circuit of FIGURE 6 is such that with inputs applied to the circuit in the manner shown terminals 102 provide a binary coded representation of shaft position as illustrated in Table II below.

Table II

| | $A_1$ | $A_7$ | $A_5$ | $A_3$ | $A_2$ | $A_8$ | $A_6$ | $A_4$ | $D_0$ | $D_1$ | $D_2$ | $D_3$ | $D_4$ |
|---|---|---|---|---|---|---|---|---|---|---|---|---|---|
| 0° | 1 | 0 | 0 | 0 | 0 | 0 | 0 | 0 | 0 | 0 | 0 | 0 | 0 |
| 11¼° | 0 | 1 | 0 | 0 | 0 | 0 | 0 | 0 | 1 | 0 | 0 | 0 | 0 |
| 22½° | 0 | 0 | 1 | 0 | 0 | 0 | 0 | 0 | 0 | 1 | 0 | 0 | 0 |
| 33¾° | 0 | 0 | 0 | 1 | 0 | 0 | 0 | 0 | 1 | 1 | 0 | 0 | 0 |
| 45° | 0 | 0 | 0 | 0 | 1 | 0 | 0 | 0 | 0 | 0 | 1 | 0 | 0 |
| 56¼° | 0 | 0 | 0 | 0 | 0 | 1 | 0 | 0 | 1 | 0 | 1 | 0 | 0 |
| 67½° | 0 | 0 | 0 | 0 | 0 | 0 | 1 | 0 | 0 | 1 | 1 | 0 | 0 |
| 78¾° | 0 | 0 | 0 | 0 | 0 | 0 | 0 | 1 | 1 | 1 | 1 | 0 | 0 |
| 90° | 1 | 0 | 0 | 0 | 0 | 0 | 0 | 0 | 0 | 0 | 0 | 1 | 0 |

Assuming that output $A_1$ exists, inverter 100 causes this to appear as a binary "0." The diodes 104 couple this output $A_1$ to all the other inverters 100 so that 0's appear at all the output terminals 102. When the shaft 18 moves to its next position so that output $A_7$ is present, since no input is applied to the inverter 100 associated with the output $D_0$, this output appears as a binary "1." The diodes 104 couple the signal $A_7$ to all the rest of the inverters so that all these inverters produce binary 0's at their terminals 102. In the third position of the shaft 18 output $A_5$ alone exists. Diode 122 applies this signal to the inverter 100 providing the $D_0$ bit while diodes 104 couple this signal to the inverter 100 providing the $D_3$ and $D_4$ bits. Thus the only inverter which has no input in this position of the shaft is the inverter 100 which provides the $D_1$ bit. Thus in this position of the shaft the $D_1$ output is a binary 1 while all the other outputs are 0's. The operation of the circuit of FIGURE 6 in the other positions of the shaft 18 can be followed through in this manner to demonstrate that the outputs at terminals 102 provide a binary representation of the position of the shaft. We have shown this representation in Table II above in which $D_0$ and $D_4$ respectively represent the bits from the least significant to the most significant of representation for 90° of shaft displacement.

Referring now to FIGURES 7 and 8 in an alternate form of our shaft position encoder indicated generally by the reference character 126 a stationary spider 128 has legs 129 which carry an annular core 130 provided with a plurality of teeth 132. Core 130 carries a generally toroidal winding 134 connected between a pair of output terminals 136 and 138. We form spider 130 with a central boss 140 which carries a winding or coil 142 adapted to be energized through conductors 144 and 146 to produce a flux in the core 130. Alternating or direct current can be used to energize winding 142. We could if desired use a permanent magnet to produce the flux in core 130. This form of our invention includes a shaft 148 supported in a bearing 150. Shaft 148 carries a plate 152 which supports a ring 154 formed with a plurality of radially inwardly directed teeth 156. We form spider 128, core 130, ring 154 and plate 152 of magnetic material to provide a path for the flux generated by winding 142. Alternatively to provide the winding 142 for generating flux, we could as well use a permanent magnet or we could form one of the elements of this form of our invention as a permanent magnet.

In the particular embodiment shown in FIGURES 7 and 8 we provide core 130 with four teeth 132 equally spaced around the core. The ring 154 carries eight teeth 156 which are located at positions around the ring corresponding to those positions at which we provide elements or teeth 28 in the form of our invention shown in FIGURES 1 and 2. When shaft 148 rotates it will readily be appreciated that the teeth 132 and 156 align with each other in the manner described hereinabove in connection with the showing of FIGURES 1 and 2. With a pair of teeth 132 and 156 aligned, a relatively high level of magnetic flux exists in the core 130 with the result that the winding 134 presents a relatively low impedance. On the other hand, when no teeth 132 and 156 are aligned, the level of the magnetic flux in the core 130 is relatively low so that the winding 134 presents a relatively high impedance. From the discussion given above of the form of our invention shown in FIGURES 1 and 2, it will be appreciated that winding 134 changes from a state of high inductance to a state of low inductance eight times during 90 degrees of rotation of shaft 148. Thus there are generated a large number of bits for each revolution of the shaft. In this form of our invention in order to use the device as a shaft position encoder a series of the devices must be assembled into a system with each device of the series producing twice the number of changes of state per revolution as the next device of the series.

In operation of the form of our invention shown in FIGURES 1 and 2 as shaft 18 is displaced in the knife edges 32 and 46 of the various teeth 28 and 38 of the device become aligned. When a pair of teeth 28 and 38 are aligned they are saturated with the result that windings 36 and 42 of these teeth produce no output signals indicating a binary "1" while all the other output windings produce outputs representing 0's. We have illustrated in Table I above the incidence of binary 1's on the various output windings as shaft 148 goes through its various series of revolutions. When the outputs of the form of our invention shown in FIGURE 1 are applied to the terminals 70 and 74 of the circuit of FIGURE 4 the various circuits 76 produce output signals $A_1$ to $A_8$ in the manner described above in connection with the showing of FIGURES 3 and 5. By using the outputs from these outputs $A_1$ to $A_8$ in the arrangement illustrated in FIGURE 6, we are able to produce a binary coded representation of shaft position on terminals 102.

In the form of our invention shown in FIGURES 7 and 8, as shaft 148 rotates, winding 138 changes between a high inductance state and a low inductance state a large number of times. These changes represent a number of binary bits per revolution of the shaft. In use of this form of our invention of a binary coder a plurality of the devices are connected in series with a more significant device producing half a number of bits per revolution as does the next least significant device.

It will be seen that we have accomplished the objects of our invention. We have provided a shaft position encoder which generates a very large number of bits for the number of teeth on the device. Our magnetic encoder has a very high resolution while retaining a relative wide intertooth spacing. For a given resolution, our encoder can be made much smaller than an encoder of the prior art having the same resolution.

It will be understood that certain features and subcombinations are of utility and may be employed without reference to other features and subcombinations. This is contemplated by and is within the scope of our claims. It is further obvious that various changes may be made in details within the scope of our claims without departing from the spirit of the invention. It is therefore to be understood that our invention is not to be limited to the specific details shown and described.

Having thus described our invention, what we claim is:

1. An encoder including in combination a first member, a second member, a plurality of equally spaced teeth carried by said first member, a plurality of unequally spaced teeth carried by said second member, means mounting said members for relative movement whereby the teeth of said first member can register with the teeth of said second member, the spacing of said teeth of said first member and the spacing of said teeth of said second member being such that only a single first member tooth registers with a single second member tooth in any relative position of said members, and respective signal producing means carried by the teeth of said first and second members, each of said signal producing means providing a signal in response to registry of its tooth with another tooth whereby respective unique signal pairs each including a signal from a first tooth signal producing means and a signal from a second tooth signal producing means are provided at a plurality of relative positions of said members.

2. An encoder including in combination first member, a plurality of equally spaced teeth carried by said first member, a second member, a plurality of unequally spaced teeth carried by said second member, means mounting said first and second members for relative rotary movement, the spacing of said teeth of said first member and the spacing of said teeth of said second member being such that only a single first member tooth registers with a single second member tooth in any relative position of said first and second members and respective signal producing means carried by the teeth of said first and second members, each of said signal producing means providing a signal in response to registry of its tooth with another tooth whereby respective unique signal pairs each including a signal from a first tooth signal producing means and a signal from a second tooth signal producing means are provided at a plurality of relative positions of said members.

3. An encoder including in combination a first member, a plurality of equally spaced teeth carried by said first member, a second member, a plurality of unequally spaced teeth carried by said second member, respective input windings carried by said teeth of said first and second members, respective output windings carried by said teeth of said first and second members, a signal source, means connecting said signal source to said intput windings whereby said output windings normally produce output signals, means mounting said first and second members for relative rotation to cause said first member teeth to register with said second member teeth at various relative positions of said members, the spacing of said teeth of said first member and the spacing of said teeth of said second member being such that only a single first member tooth registers with a second member tooth in any relative position of said members, and means for saturating registering teeth of said first and second members whereby the output windings of said registering teeth carry no output signals in response to said input signals.

4. An encoder including in combination a first member formed of magnetic material, said first member having a plurality of equally spaced teeth, a second member formed of magnetic material, said second member having a plurality of unequally spaced teeth, means mounting said first and second members for relative movement, the spacing of said teeth of said first member and the spacing of said teeth of said second member being such that only a single first tooth can register with a single second tooth in any relative positon of said members, means for generating a flux passing through said members and said teeth of said first and second members, and respective signal producing means carried by the teeth of said first and second members, each of said signal producing means providing a signal in response to registry of its tooth with another tooth whereby respective unique signal pairs each including a signal from a first tooth signal producing means and a signal from a second tooth signal producing means are provided at a plurality of relative positions of said members.

5. An encoder including in combination a first member, a plurality of circuit elements carried by said first member, a second member, a plurality of circuit elements carried by said second member, each of said circuit elements normally occupying a first state and adapted to be switched to a second state, means mounting said first and second members for relative movement and means for switching respective unique pairs of said elements from said first state to said second state at a plurality of relative positions of said first and second members, each of said unique pairs including an element carried by said first member and an element carried by said second member.

6. An encoder including in combination a first member, a plurality of spaced first means for producing first signals carried by the first member, a second member, a plurality of spaced second means for porducing second signals carried by said second member, each of said first and second signal producing means providing its signal in response to aligment with any other of said second and first signal producing means and means mounting said first and second members for relative movement to cause said first and second signal producing means to provide respective unique pairs of signals at a plurality of relative positions of said first and second members each of said unique signal pairs including a first signal and a second signal.

7. A shaft position encoder including in combination a support, a plurality of spaced first means for providing first signals carried by said support, a shaft, a plurality of spaced second means for producing second signals carried by said shaft, each of said first and second signal producing means providing its signal in response to alignment with any other of said second and first signal producing means and means mounting said shaft on said support for rotary movement to cause said first and second signal producing means to produce respective unique pairs of signals at a plurality of relative positions of said shaft and said support, each of said unique signal pairs including a first signal and a second signal.

8. A shaft position encoder including in combination a support, a plurality of spaced first means for providing first signals carried by said support, a shaft, a plurality of spaced second means for producing second signals carried by said shaft, each of said first and second signal producing means providing its signal in response to alignment with any other of said second and first signal producing means, means mounting said shaft on said support for rotary movement to cause said first and second signal producing means to produce respective unique pairs of signals at a plurality of relative positions of said shaft and said support, each of said unique signal pairs including a first signal and a second signal and means responsive to said signal pairs for producing a digital indication of shaft position.

9. A shaft position encoder including in combination a support, a plurality of spaced first means for providing signals carried by said support, a shaft, a plurality of spaced second means for producing second signals carried by said shaft, each of said first and second signal producing means providing its signal in response to alignment with any other of said second and first signal producing means, means mounting said shaft on said support for rotary movement to cause said first and second signal producing means to produce respective unique pairs of signals at a plurality of relative positions of said shaft and said support, each of said unique signal pairs including a first signal and a second signal and means responsive to said signal pairs for producing a binary coded decimal representation of shaft position.

10. A shaft position encoder including in combination a support, a plurality of spaced first means for providing first signals carried by said support, a shaft, a plurality of spaced second means for producing second signals carried by said shaft, each of said first and second signal producing means providing an output in response to alignment with any other of said second and first signal producing means, means mounting said shaft on said support for rotary movement to cause said first and second signal producing means to produce respective unique pairs of signals at a plurality of relative positions of said shaft and said support, each of said unique signal pairs including a first signal and a second signal, means responsive to said signal pairs for producing a digital representation of shaft position and means responsive to said digital representation for producing a binary coded representation of shaft position.

References Cited by the Examiner
UNITED STATES PATENTS

| | | | |
|---|---|---|---|
| 2,931,023 | 3/60 | Quade | 340—347 |
| 2,938,198 | 5/60 | Berman et al. | 340—347 |
| 3,066,286 | 11/62 | Wright | 340—347 |

MALCOLM A. MORRISON, *Primary Examiner.*